July 15, 1969 R. S. HARDING 3,455,011
O-RING ASSEMBLY TOOL
Filed July 8, 1966

INVENTOR
RAY S. HARDING
BY
Geo. J. Muckenthaler ATTY
AGT

United States Patent Office 3,455,011
Patented July 15, 1969

3,455,011
O-RING ASSEMBLY TOOL
Ray S. Harding, Racine, Wis., assignor to J. I. Case
Company, Racine, Wis.
Filed July 8, 1966, Ser. No. 563,750
Int. Cl. B23p 19/02; B25b 7/02
U.S. Cl. 29—235                            5 Claims

ABSTRACT OF THE DISCLOSURE

A pliers type of tool for inserting rings into recesses in bores, and including two pivotally related jaws. One of the jaws is arranged to grip and restrain movement of the ring when the other jaw is pivoted toward the first jaw for pulling the ring toward and against the restraining portion. The other or second jaw has a pull portion and a push portion, operative on the ring, for holding the ring on the jaws and for releasing the jaws from the ring, respectively, and in one embodiment of the invention. The tool has handles which are spring-urged apart, and they have adjusting means for limiting the outward pivotal motion of the handles and the jaws. Also, releasable connecting means are applied to one of the jaws so that the one jaw can be removed and replaced, replacement being with different size jaws, if desired.

---

This invention relates to a tool for use in inserting or installing flexible parts in cylindrical enclosures and more specifically for use in installing O-rings in locations or grooves which are internal to bores in hydraulic cylinders.

The installation of O-rings as oil seals into grooves in the internal bore of hydraulic cylinder packing glands is usually done manually with both hands holding the O-ring and at the same time distorting the shape thereof to permit passage across the internal surface of the bore and into the groove. While this method of installation has been generally satisfactory, it is time consuming and visual observation is usually required for the proper placement of the O-ring in the groove. In the case of flexible rings which are substantially circular in cross section the installation may require only a slight distortion of the ring after which the ring is then pushed or rolled into the groove. However, it is known that in some instances the flexible rings are not circular in cross section and the installation is more difficult when manipulating the ring into position and into the groove. Manual handling of flexible rings is sometimes awkward due to the characteristics of the ring material and therefore a faster and more efficient installation means is desired.

The principal object of this invention is to provide an assembly device or tool for installing flexible rings in cylinder grooves.

Another object is to provide a tool for distorting a portion of a flexible ring to expedite insertion of the ring in a bore having a smaller diameter than the ring itself.

A further object is to provide a tool by which a flexible ring can be held in a distorted manner on the tool while inserting the tool in a cylinder and then operating the tool to position the ring in the groove.

Another object is to provide a tool which can be used for various sized flexible rings.

Additional objects and advantages will become apparent from a reading of the following specification and the annexed drawings, in which.

Figure 1:
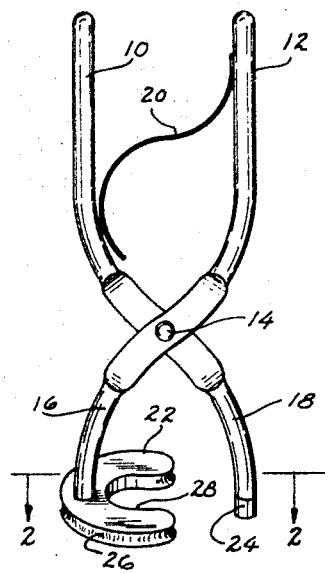
FIGURE 1 is a perspective view of the tool in its open position.

As seen in FIG. 1, the assembly device is a tool which is useful for installing flexible rings in cylinders where the cylinder has a groove in the internal bore surface for reception of the ring. The basic tool, which may be called an O-ring assembly tool, includes a pair of handles 10 and 12 pivotally connected at pin 14 to a tool means which includes members 16 and 18. In the device shown in FIG. 1, members 16 and 18 are extending portions of handles 10 and 12 and it can be seen that as the handles are opened and closed by some exterior force, members 16 and 18 also open and close as in the lever action of a typical pair of pliers.

A resilient means shown as a wire spring 20 is connected to handle 12, and extends into contact with handle 10 to urge the tool into an open position.

The tool includes a first means 22 and a second means 24, the first means being shown as a horseshoe-shaped jaw element connected to member 16. Member 22 has a concave surface or groove 26 on the outer portion thereof and it has a slot 28 in one side. The tool also includes the second member 24 shown as a pin jaw which is connected to member 18.

Figures 2, 3:
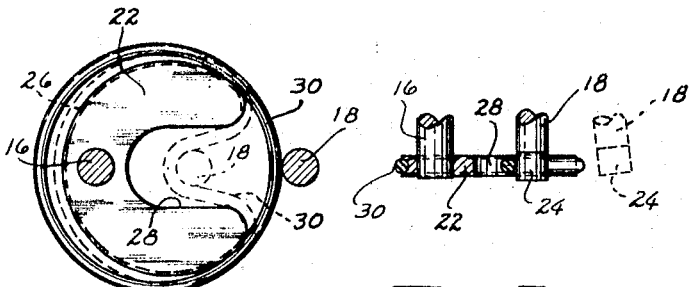
FIG. 2 is a plan view of the tool taken along the line 2—2 of FIG. 1 and showing a flexible ring prior to distortion, and showing a second position of the tool and ring, in dotted lines.
FIG. 3 is a sectional view of the dotted position of FIG. 2, and showing in dotted lines a piece which is shown in full lines in FIG. 2.

The horseshoe jaw 22 and the pin jaw 24 are positioned such that when the handles 10 and 12 are urged together or closed, jaw 24 moves towards and into slot 28. FIGS. 2 and 3 show the positions taken by the jaws when the handles are open and closed. It is noted that jaw 22 is substantially normal to element 16 and that as jaw 24 is moved into slot 28, jaw 24 extends slightly beyond the edge of jaw 22 as shown in FIG. 3.

In the open position, the end of pin jaw 24 is substantially even with the lower plane of the horseshoe jaw 22, as shown dotted in FIG. 3. In the closed position, the end of jaw 24 is slightly beyond the lower plane of jaw 22.

The object of the invention is to provide the tool for inserting a flexible ring 30 in an enclosure or cylinder. Ring 30 is shown in FIG. 2 as being placed around jaw 22 and in groove 26, but only on opposite sides of the groove 26 since the ring 30 is larger than the groove 26 and is ready to be engaged by jaw 24. It may be well to note that flexible rings of various sizes and shapes are known, however, the flexible ring in this disclosure will be described as an O-ring commonly made of a resilient material which is capable of being stretched or distorted. The tool may also be adapted to insert other rings, such as closed circular springs and the like. FIGS. 1 and 2 show an embodiment where the O-ring may be of a material which tends to restore itself to the circular shape after it has been distorted.

In the operation of the device, the O-ring is placed around the jaw 22 in groove 26, the tool being held in a position to receive the ring, this being when the jaws are open and jaw 24 is in the dotted position of FIG. 3. The handles are then urged to a closed position which causes jaw 24 to move against ring 30 and thus forces a portion of the ring into slot 28. The groove 26 extends around the jaw 22 and into slot 28 so that ring 30 can be seated in the groove. With the ring 30 distorted into slot 28, the tool is inserted into the bore of an enclosure such as a cylinder, positioned such that the jaw 22 is aligned in the proper place such as with a groove and then the handles are released which, in the case of a ring which restores itself to the original shape, sets the ring into the groove position and the device is then withdrawn from the cylinder.

The embodiment shown in FIG. 1 works best with the rings which spring back into a circular shape, since, the ring is aligned with the cylinder groove, jaw 24 must hold a slight distortion in the ring until the jaw can pass between the ring and the cylinder bore as the tool is being removed from the cylinder. The slight distorted portion of ring 30 then assumes its original shape in the groove of the cylinder.

Figure 4:
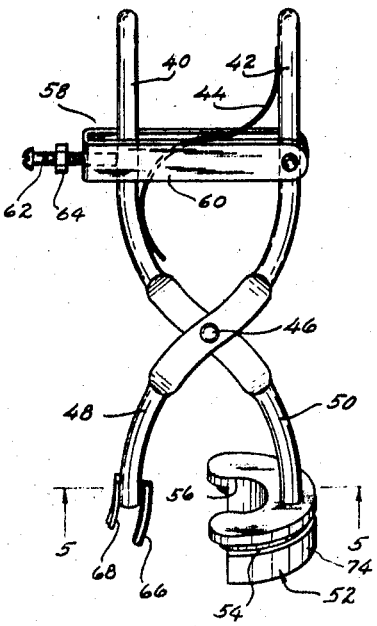
FIG. 4 is a perspective view of a modification of the tool shown in FIG. 1.
Figure 6:
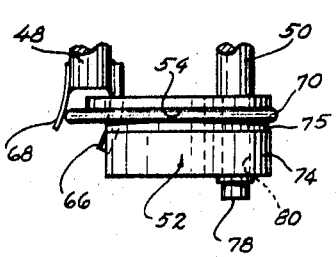
FIG. 6 is a side view of the tool jaw shown in FIG. 4, and with the tool in the open position and showing the means for utilizing various sized jaws on the tool.

A second embodiment is shown in FIGS. 4–7 and this device may be taken as the preferred structure in that it provides an assembly device which is useful for many more types of rings and also provides a more dependable positioning of the ring in the cylinder. This structure includes handles 40 and 42 which are urged to the open position by a resilient means as a wire spring 44. The handles are pivotally connected as by a pin 46 to the tool which includes a member 48 and a member 50. The first tool means is shown as a horseshoe-shaped jaw element 52 connected to member 50. Jaw 52 has a groove 54 on the outer surface which is shown in FIG. 6 to be square-sided but, of course, this could be concave as for the embodiment shown in FIGS. 1 and 3, or it could assume other shapes depending upon the design of the flexible ring. Jaw 52 has a slot 56 in one side thereof, and the groove 54 extends around the outer edge of jaw 52 and into the slot. An adjusting means 58 is connected to handle 42 and includes a fork element 60, a screw 62 and a nut 64, the screw being engageable with handle 40. The fork 60 limits the amount of opening and closing the handles and also can be used to set the handle opening for a certain size ring in the case when the tool is used to install a number of rings of the same size. When a different size group of rings is intended to be installed the means 58 is adjusted accordingly.

Figure 5:
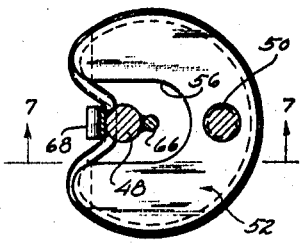
FIG. 5 is a sectional view taken along the line 5—5 of FIG. 4, and with parts in a different position and showing a flexible ring distorted.
Figure 7:
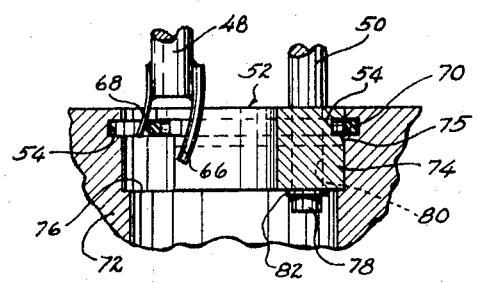
FIG. 7 is a sectional view along line 7—7 of FIG. 5 showing the tool in position in a cylinder for installing the flexible ring in the cylinder groove.

A push element 66 and a pull element 68 are connected to member 48, the pull element being of flat or bar-shaped design and the push element being circular or rod shaped. Of course these elements could assume other shapes but these have worked more efficiently. These elements are positioned such that as the handles are closed, the member 48 with the elements 66 and 68 move in the direction of slot 56 in jaw 52. FIGS. 5, 6, and 7 show a flexible ring 70 placed in groove 54, a portion of the ring being shown in various positions.

In the operation of the second embodiment, the ring is placed around the jaw 52 in groove 54, the tool and handles being held in a position to receive the ring. The ring 70 is positioned between the push-and-pull elements 66 and 68 and the handles are urged to a closed position.

The pull element 68 engages a portion of the ring 70 and distorts that portion of the ring into slot 56 and snugly into groove 54 around the outer surface of jaw 52, as shown in FIG. 5. The diameter of jaw 52 and the width of slot 56 are made to accept one of a number of various sized rings. With the ring distorted and held in the slot by the action of handles 40 and 42 and pull element 68, the device is inserted into a cylinder 72 as shown in FIG. 7. In this view, jaw 52 has a portion 74 which is constructed to seat against a shoulder 76 in the cylinder 72, when the tool is in the proper position for installing the ring 70. When the ring is in the aligned position with the groove in the cylinder, the handles are released towards an open position and the push element 66 then forces the distorted portion into the groove. It is to be noted that the push element 66 is slightly longer than the pull element 68 so that as the tool is withdrawn from the cylinder, the ring 70 will be cleared by the pull element and thus allow the push element to force the ring into the groove. As seen in FIG. 6, jaw 52 includes a sloping portion 75 for ease in removing jaw 52 from ring 70 when withdrawing the tool from the cylinder. The structure and postitioning of these elements on member 48 is such that element 68 contains ring 70 in a slightly distorted position as element 66 pushes the ring towards and into the cylinder groove. This feature is especially important in the case of a ring which is made of material which does not readily return to a circular position. Many flexible rings, once distorted, will not return to their original shape, and the pusher is extremely valuable to place the ring securely in the groove.

FIGS. 6 and 7 show member 50 and jaw 52 having means for utilizing jaws of various sizes. Member 50 has a portion or pin 78 connected thereto which pin is in a bore 80 in jaw 52. A snap ring 82 is on pin 78 to retain the jaw securely to the member. With this structure, different sized jaws can be connected to member 50 for various sized rings.

It is thus seen that herein shown and described is an assembly device which performs as a tool for installing flexible rings in enclosures of the cylinder type. This device greatly aids the mechanic in fast and efficient installation of the rings and also does away with the awkward handling of O-rings as in present day practices.

While two embodiments have been shown and described, the invention is intended to cover other similar structures.

Variations on the foregoing description will no doubt occur to those skilled in the art; however, it is to be understood that all such variations are contemplated as within the scope of the invention, and the invention is not intended to be taken as limited by the two embodiments disclosed nor in fact in any manner except as defined in the following claims.

What is new and desired to be secured by Letters Patent of the United States is:

1. In a pliers type of tool for inserting a resilient ring into a recess in a cylindrical bore, a pair of ring-engaging jaws, a pair of pivotally connected handles connected to said jaws for pivoting said jaws toward and away from each other, the improvement comprising one of said jaws having a groove extending along the plane of pivotal movement of said one jaw and on the side of said one jaw opposite the location of the other of said jaws and extending arcuately for at least a semi-circular distance along the plane of said groove for receiving a portion of the circular length of said resilient ring and holding said resilient ring on said one jaw, said one jaw having a slot extending across said plane of said groove on the side of said one jaw adjacent said other jaw, said other jaw extending across said plane of said groove upon pivotal movement of said other jaw toward said one jaw and extending into said slot in said one jaw for engaging said resilient ring and pulling said resilient ring into said groove and into said slot to hold said resilient ring for positioning in said cylindrical bore recess upon release of said ring by said jaws.

2. The subject matter of claim 1, including adjustable restraining means operative on said jaws for limiting the pivotal movement of said jaws away from each other.

3. The subject matter of claim 1, including releasable connecting means operative between said one jaw and said handles for removal and replacement of said one jaw on said handles.

4. The subject matter of claim 1, wherein said other jaw includes two pieces spaced apart in the direction of pivotal movement of said other jaw for receiving the thickness of said resilient ring and respectively push and pull on said resilient ring upon pivoting of said other jaw in both directions.

5. The subject matter of claim 4, wherein said two pieces are of different lengths extending in the direction away from the pivot axis of said handles, the one of said two pieces closer to said other jaw being the longer one of said two pieces.

References Cited

UNITED STATES PATENTS

| | | | |
|---|---|---|---|
| 1,968,640 | 7/1934 | Elms | 29—235 |
| 2,510,206 | 6/1950 | Barkan et al. | 29—235 X |
| 2,977,674 | 4/1961 | Arthur | 29—268 X |
| 3,350,767 | 11/1967 | Yannuzzi | 29—235 |
| 1,319,007 | 10/1919 | Kind | 29—223 |
| 2,562,128 | 7/1951 | Sawdy | 29—224 |
| 1,141,916 | 6/1915 | Aderer | 81—419 X |
| 3,041,712 | 7/1962 | Wurzel | 29—229 |

JOHN F. CAMPBELL, Primary Examiner

D. C. REILEY, Assistant Examiner

U.S. Cl. X.R.

29—224, 269, 451; 81—419